(12) United States Patent
Chang et al.

(10) Patent No.: US 9,018,932 B2
(45) Date of Patent: Apr. 28, 2015

(54) INITIAL VOLTAGE GENERATION CIRCUIT AND METHOD OF GENERATING AN INITIAL VOLTAGE

(71) Applicant: Etron Technology, Inc., Hsinchu (TW)

(72) Inventors: Yen-An Chang, Miaoli County (TW); Yi-Hao Chang, Hsinchu (TW)

(73) Assignee: Etron Technology, Inc., Hsinchu (TW)

( * ) Notice: Subject to any disclaimer, the term of this patent is extended or adjusted under 35 U.S.C. 154(b) by 167 days.

(21) Appl. No.: 13/787,837

(22) Filed: Mar. 7, 2013

(65) Prior Publication Data

US 2013/0234694 A1 Sep. 12, 2013

Related U.S. Application Data

(60) Provisional application No. 61/608,647, filed on Mar. 9, 2012.

(51) Int. Cl.
*G05F 1/00* (2006.01)
*G06F 3/02* (2006.01)

(52) U.S. Cl.
CPC ........................................ *G06F 3/02* (2013.01)

(58) Field of Classification Search
USPC .............. 307/36–38; 323/212, 281, 312–317; 361/18
See application file for complete search history.

(56) References Cited

U.S. PATENT DOCUMENTS

| 7,772,935 B2* | 8/2010 | Jan ................................. 331/185 |
| 7,791,855 B2* | 9/2010 | Carcouet et al. .............. 361/117 |
| 2002/0079923 A1* | 6/2002 | Tinsley et al. ................... 326/83 |
| 2004/0174150 A1* | 9/2004 | Zhang et al. ................... 323/274 |
| 2007/0159232 A1 | 7/2007 | Kim |
| 2007/0296392 A1* | 12/2007 | Chen et al. ..................... 323/313 |
| 2009/0160251 A1* | 6/2009 | Mok et al. ........................ 307/24 |
| 2009/0237854 A1* | 9/2009 | Mok et al. ...................... 361/111 |
| 2014/0002049 A1* | 1/2014 | Schrom et al. ................. 323/311 |

FOREIGN PATENT DOCUMENTS

CN 102253253 A 11/2011

* cited by examiner

*Primary Examiner* — Adolf Berhane
*Assistant Examiner* — Gary Nash
(74) *Attorney, Agent, or Firm* — Winston Hsu; Scott Margo (57) ABSTRACT

An initial voltage generation circuit includes a reference voltage generator, a reference voltage selector, at least one initial voltage level regulator, and a plurality of stabilization capacitors. The reference voltage generator generates a plurality of reference voltage candidate groups. The reference voltage selector includes a plurality of selection switch groups and a plurality of switch control circuits. Each selection switch group includes a plurality of parallel switches. Each switch control circuit corresponds to a selection switch group for generating a switch signal to control the selection switch group to output a reference voltage candidate of a corresponding reference voltage candidate group. Each initial voltage level regulator generates an inner reference voltage according to a power-up signal, and a stabilization capacitor corresponding to the initial voltage level regulator is used for stabilizing the inner reference voltage.

33 Claims, 8 Drawing Sheets

INITIAL VOLTAGE GENERATION CIRCUIT AND METHOD OF GENERATING AN INITIAL VOLTAGE

CROSS REFERENCE TO RELATED APPLICATIONS

This application claims the benefit of U.S. Provisional Application No. 61/608,647, filed on Mar. 9, 2012 and entitled "Initialization System In Reference Circuit," the contents of which are incorporated herein by reference.

BACKGROUND OF THE INVENTION

1. Field of the Invention

The present invention relates to an initial voltage generation circuit and a method of generating an initial voltage, and particularly to an initial voltage generation circuit and a method of generating an initial voltage that can utilize an initial voltage level regulator to quickly regulate a voltage level of an inner reference voltage outputted by the initial voltage generation circuit.

2. Description of the Prior Art

Figure 1:
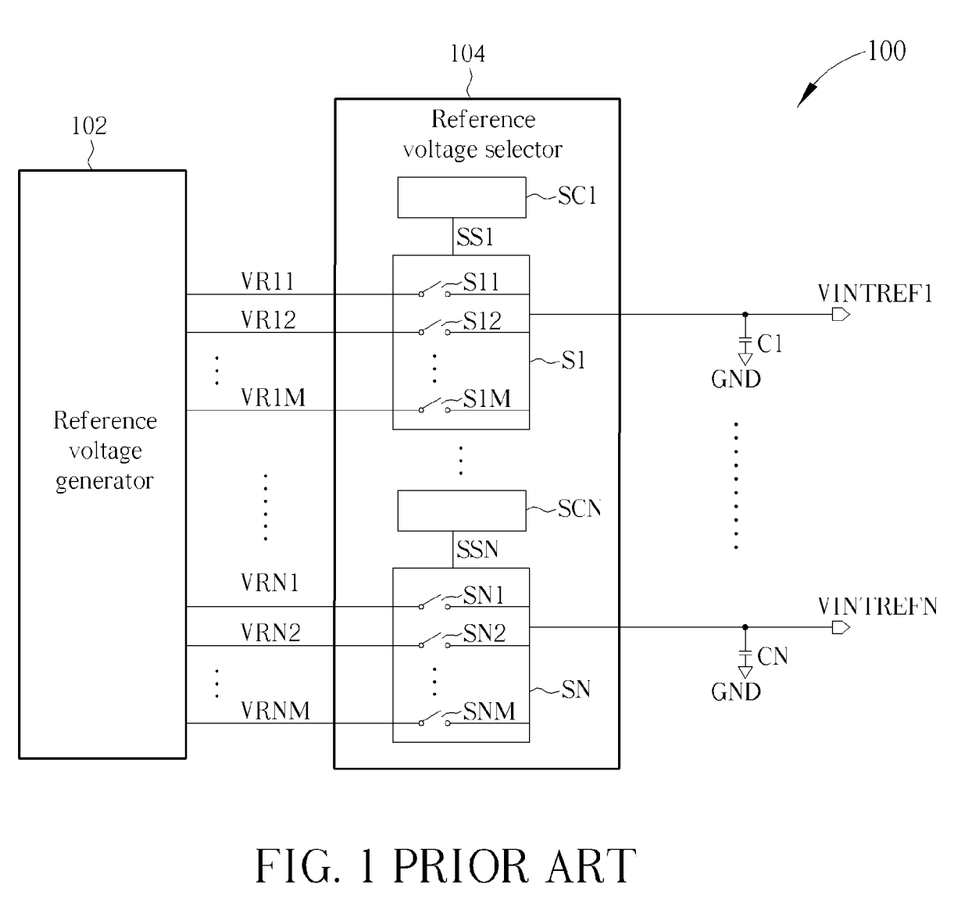
FIG. 1 is a diagram illustrating an initial voltage generation circuit according to the prior art.

Please refer to FIG. 1. FIG. 1 is a diagram illustrating an initial voltage generation circuit 100 according to the prior art. The initial voltage generation circuit 100 includes a reference voltage generator 102, a reference voltage selector 104, and N stabilization capacitors C1-CN, where the reference voltage selector 104 includes N selection switch groups S1-SN and N switch control circuits SC1-SCN, and N is a positive integer. As shown in FIG. 1, the reference voltage generator 102 generates N reference voltage candidate groups, and each reference voltage candidate group corresponds to a selection switch group, where a selection switch group includes M parallel switches, and M is a positive integer. Then, each switch control circuit can generate a switch signal to control a selection switch group to output a reference voltage candidate of a reference voltage candidate group. For example, a first reference voltage candidate group VR11-VR1M of the N reference voltage candidate groups corresponds to the first selection switch group S1, where the first selection switch group S1 includes M parallel switches S11-S1M. Then, the switch control circuit SC1 can generate a switch signal SS1 to control the first selection switch group S1 to output a reference voltage candidate (e.g. a reference voltage candidate VR11) of the first reference voltage candidate group VR11-VR1M. In addition, the stabilization capacitor C1 is used for stabilizing the reference voltage candidate VR11.

Figure 2:
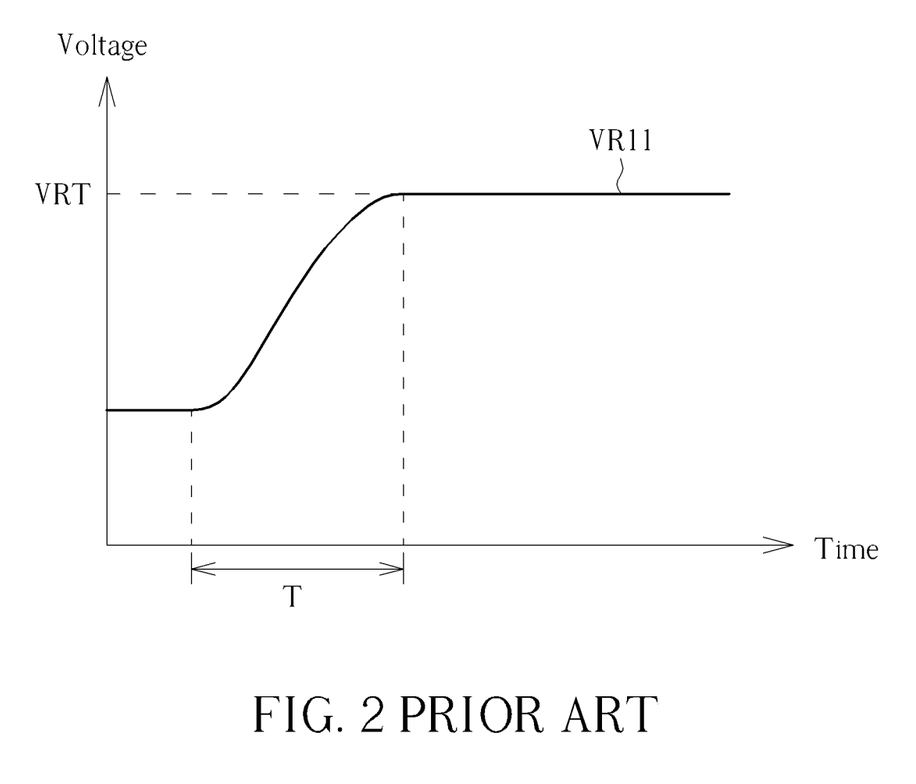
FIG. 2 is a diagram illustrating variation of the reference voltage candidate within a period of time.

Please refer to FIG. 2. FIG. 2 is a diagram illustrating variation of the reference voltage candidate VR11 within a period of time T. As shown in FIG. 1 and FIG. 2, because the reference voltage candidate VR11 needs to pass through the first selection switch group S1 before the reference voltage candidate VR11 is outputted, when the first selection switch group S1 outputs the reference voltage candidate VR11, the reference voltage candidate VR11 needs the period of time T to be increased to a target value VRT. Therefore, because the reference voltage candidate VR11 needs the period of time T to be increased to the target value VRT during power-up of a system, some circuits within the system may fail to power up. In addition, when the first selection switch group S1 is coupled to a large load, the large load may spend much time to power up because the reference voltage candidate VR11 needs a longer period of time to be increased to the target value VRT. Therefore, the initial voltage generation circuit 100 is not a good initial voltage generation circuit for the system.

SUMMARY OF THE INVENTION

An embodiment provides an initial voltage generation circuit. The initial voltage generation circuit includes a reference voltage generator, a reference voltage selector, at least one initial voltage level regulator, and a plurality of stabilization capacitors. The reference voltage generator is used for generating a plurality of reference voltage candidate groups. The reference voltage selector is used for receiving the plurality of reference voltage candidate groups, where the reference voltage selector includes a plurality of selection switch groups and a plurality of switch control circuits. Each selection switch group corresponds to a reference voltage candidate group of the plurality of reference voltage candidate groups, and the selection switch group includes a plurality of parallel switches. Each switch control circuit corresponds to a selection switch group of the plurality of selection switch groups for generating a switch signal to control the selection switch group to output a reference voltage candidate of a corresponding reference voltage candidate group. Each initial voltage level regulator of the at least one initial voltage level regulator and a corresponding stabilization capacitor of the plurality of stabilization capacitors are coupled to a selection switch group of the plurality of selection switch groups, where the initial voltage level regulator is used for generating an inner reference voltage according to a power-up signal, and the corresponding stabilization capacitor is used for stabilizing the inner reference voltage.

Another embodiment provides an initial voltage generation circuit. The initial voltage generation circuit includes a first reference voltage generator, a reference voltage selector, an initial voltage level regulator, at least one stabilization capacitor, a low dropout regulation unit, and a second reference voltage generator. The first reference voltage generator is used for generating a plurality of reference voltage candidate groups. The reference voltage selector includes at least one selection switch group and at least one switch control circuit for receiving at least one reference voltage candidate group of the plurality of reference voltage candidate groups, where each selection switch group corresponds to a reference voltage candidate group of the at least one reference voltage candidate group and a switch control circuit of the at least one switch control circuit, where the switch control circuit is used for generating a switch signal to control the selection switch group to output a reference voltage candidate of the reference voltage candidate group. The initial voltage level regulator and a stabilization capacitor of the at least one stabilization capacitor are coupled to a selection switch group of the at least one selection switch group, where the initial voltage level regulator is used for generating an inner reference voltage according to a power-up signal, and the stabilization capacitor is used for stabilizing the inner reference voltage. The low dropout regulation unit is used for generating a first voltage according to the inner reference voltage. The second reference voltage generator is used for generating a plurality of second reference voltages according to the power-up signal and the first voltage, the power-up signal and the inner reference voltage, or the power-up signal and a reference voltage candidate.

Another embodiment provides a method of generating an initial voltage, where an initial voltage generation circuit includes a reference voltage generator, a reference voltage selector, at least one initial voltage level regulator, and a plurality of stabilization capacitors, and the reference voltage selector includes a plurality of selection switch groups and a plurality of switch control circuits. The method includes the reference voltage generator generating a plurality of reference voltage candidate groups; the reference voltage selector receiving the plurality of reference voltage candidate groups; each switch control circuit of the plurality of switch control circuits generating a switch signal to control a selection switch group to output a reference voltage candidate of a corresponding reference voltage candidate group; and each initial voltage level regulator of the at least one initial voltage level regulator generating an inner reference voltage according to a power-up signal.

Another embodiment provides a method of generating an initial voltage, where an initial voltage generation circuit includes a first reference voltage generator, a reference voltage selector, an initial voltage level regulator, at least one stabilization capacitor, a low dropout regulation unit, and a second reference voltage generator, and the reference voltage selector includes at least one selection switch group and at least one switch control circuit. The method includes the first reference voltage generator generating a plurality of reference voltage candidate groups; each selection switch group of the at least one selection switch group generating a switch signal to control a selection switch group to output a reference voltage candidate of a corresponding reference voltage candidate group; the initial voltage level regulator generating an inner reference voltage according to a power-up signal; the low dropout regulation unit generating a first voltage according to the inner reference voltage; and the second reference voltage generator generating a plurality of second reference voltages according to the power-up signal and the first voltage, the power-up signal and the inner reference voltage, or the power-up signal and a reference voltage candidate.

The present invention provides an initial voltage generation circuit and a method of generating an initial voltage. The initial voltage generation circuit and the method utilize an initial voltage level regulator to generate an appropriate voltage level of an inner reference voltage according to a power-up signal to accelerate a power-up process of a system. Compared to the prior art, because the inner reference voltage does not need a longer period of time to be increased to a target value, some circuits within the system do not fail to power up. Therefore, the initial voltage generation circuit and the method of generating an initial voltage presented by the present invention can be normally applied to any process, voltage and temperature (PVT) variation.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
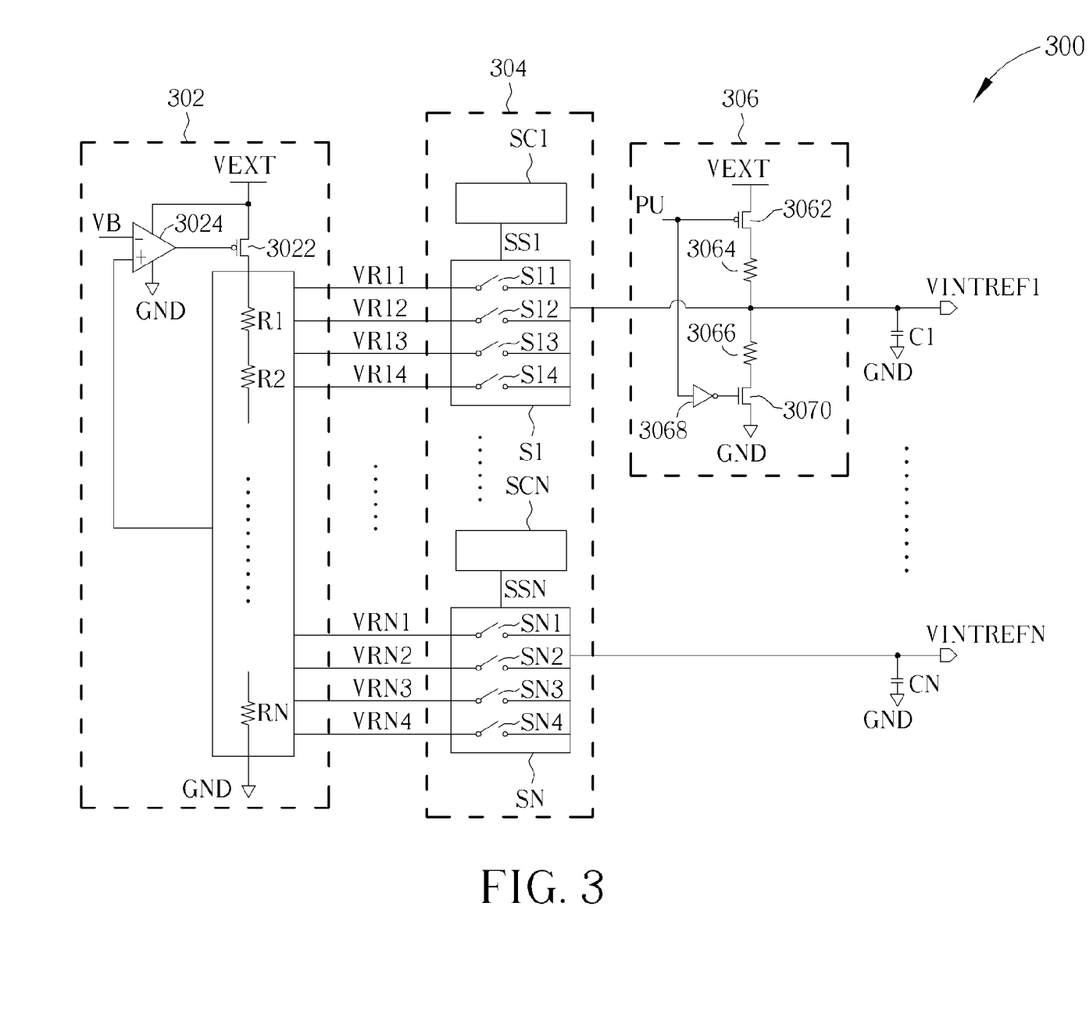
FIG. 3 is a diagram illustrating an initial voltage generation circuit according to an embodiment.

Please refer to FIG. 3. FIG. 3 is a diagram illustrating an initial voltage generation circuit 300 according to an embodiment. The initial voltage generation circuit 300 includes a reference voltage generator 302, a reference voltage selector 304, an initial voltage level regulator 306, and N stabilization capacitors C1-CN, where N is a positive integer. But, the present invention is not limited to the initial voltage generation circuit 300 only including the initial voltage level regulator 306. That is to say, the initial voltage generation circuit 300 can include at least one initial voltage level regulator. The reference voltage generator 302 is used for generating N reference voltage candidate groups. The reference voltage selector 304 is used for receiving the N reference voltage candidate groups, where the reference voltage selector 304 includes N selection switch groups S1-SN and N switch control circuits SC1-SCN. Each selection switch group corresponds to a reference voltage candidate group of the N reference voltage candidate groups generated by the reference voltage generator 302, and each selection switch group includes a plurality of parallel switches (e.g. four parallel switches). But, the present invention is not limited to each selection switch group including four parallel switches. Each switch control circuit corresponds to a selection switch group of the N selection switch groups S1-SN for generating a switch signal to control the selection switch group to output a reference voltage candidate of a corresponding reference voltage candidate group. For example, a first reference voltage candidate group VR11-VR14 of the N reference voltage candidate groups corresponds to the first selection switch group S1, and the $N^{th}$ reference voltage candidate groups VRN1-VRN4 corresponds to the $N^{th}$ selection switch group SN, where the first selection switch group S1 includes four parallel switches S11-514, and the $N^{th}$ selection switch group SN includes four parallel switches SN1-SN4. As shown in FIG. 3, the switch control circuit SC1 corresponds to the first selection switch group S1 for generating a switch signal SS1 to control the first selection switch group S1 to output a reference voltage candidate (e.g. the reference voltage candidate VR11) of the first reference voltage candidate group VR11-VR14. That is to say, as shown in FIG. 3, the first selection switch group S1 turns off the switches S12-S14 and turns on the switch S11 according to the switch signal SS1, so the first selection switch group S1 can output the reference voltage candidate VR11. In addition, operational principles of other selection switch groups S2-SN of the N selection switch groups S1-SN are the same as those of the first selection switch group S1, so further description thereof is omitted for simplicity.

As shown in FIG. 3, the reference voltage generator 302 includes a first P-type metal-oxide-semiconductor transistor 3022, an amplifier 3024, and a plurality of series resistors R1-RN, where N is a positive integer. The first P-type metal-oxide-semiconductor transistor 3022 has a first terminal for receiving an external voltage VEXT, a second terminal, and a third terminal. The amplifier 3024 has a first terminal for receiving the external voltage VEXT, a second terminal coupled to the second terminal of the first P-type metal-oxide-semiconductor transistor 3022, a third terminal coupled to ground GND, a fourth terminal for receiving a bandgap reference voltage VB, and a fifth terminal. The plurality of series resistors R1-RN are coupled to the third terminal of the first P-type metal-oxide-semiconductor transistor 3022, the fifth terminal of the amplifier 3024, and the ground GND for outputting the N reference voltage candidate groups according to the bandgap reference voltage VB and resistances of resistors R1-RN.

As shown in FIG. 3, the initial voltage level regulator 306 and the stabilization capacitor C1 are coupled to the first selection switch group S1, where the initial voltage level regulator 306 is used for generating an inner reference voltage VINTREF1 according to a power-up signal PU, and the stabilization capacitor C1 is used for stabilizing the inner reference voltage VINTREF1. The initial voltage level regulator 306 includes a second P-type metal-oxide-semiconductor transistor 3062, a first resistor 3064, a second resistor 3066, an inverter 3068, and a first N-type metal-oxide-semiconductor transistor 3070. The second P-type metal-oxide-semiconductor transistor 3062 has a first terminal for receiving the external voltage VEXT, a second terminal for receiving the power-up signal PU, and a third terminal. The first resistor 3064 has a first terminal coupled to the third terminal of the second P-type metal-oxide-semiconductor transistor 3062, and a second terminal coupled to the first selection switch group S1 for outputting the inner reference voltage VINTREF1. The second resistor 3066 has a first terminal coupled to the second terminal of the first resistor 3064, and a second terminal. The inverter 3068 has a first terminal coupled to the second terminal of the second P-type metal-oxide-semiconductor transistor 3062 for receiving the power-up signal PU, and a second terminal. The first N-type metal-oxide-semiconductor transistor 3070 has a first terminal coupled to the second terminal of the second resistor 3066, a second terminal coupled to the second terminal of the inverter 3068, and a third terminal coupled to the ground GND. The power-up signal PU is generated by a power-up unit of a system, where the initial voltage generation circuit 300 is applied to the system. When the power-up signal PU is low, because the second P-type metal-oxide-semiconductor transistor 3062 and the first N-type metal-oxide-semiconductor transistor 3070 are turned on, the inner reference voltage VINTREF1 is determined according to equation (1):

$$\text{VINTREF1} = \text{VEXT} * (r2/(r1+r2)) \tag{1}$$

As shown in equation (1), r1 is a resistance of the first resistor 3064 and r2 is a resistance of the second resistor 3066. When the power-up signal PU is high, because the second P-type metal-oxide-semiconductor transistor 3062 and the first N-type metal-oxide-semiconductor transistor 3070 are turned off, the inner reference voltage VINTREF1 is equal to a reference voltage candidate (e.g. the reference voltage candidate VR11) outputted by the first selection switch group S1. In addition, a voltage VEXT (r2/(r1+r2)) can be lower than the reference voltage candidate (e.g. the reference voltage candidate VR11) outputted by the first selection switch group S1. Therefore, the inner reference voltage VINTREF1 does not need a period of time to be increased to a target value. That is to say, when the power-up signal PU is low, the inner reference voltage VINTREF1 can first immediate be increased to the higher voltage VEXT (r2/(r1+r2)) through the external voltage VEXT, the first resistor 3064, and the second resistor 3066. Therefore, because the inner reference voltage VINTREF1 does not need a period of time to be increased to the target value during power-up of the system, some circuits within the system do not fail to power up. In addition, as shown in FIG. 3, during power-up of the system, if some circuits (e.g. memory cells) within the system do not need fast responsive power-up voltages, reference voltage candidates VINTREF2-VINTREFN outputted by the other selection switch groups S2-SN do not need to be regulated by additional initial voltage level regulators.

Figure 4:
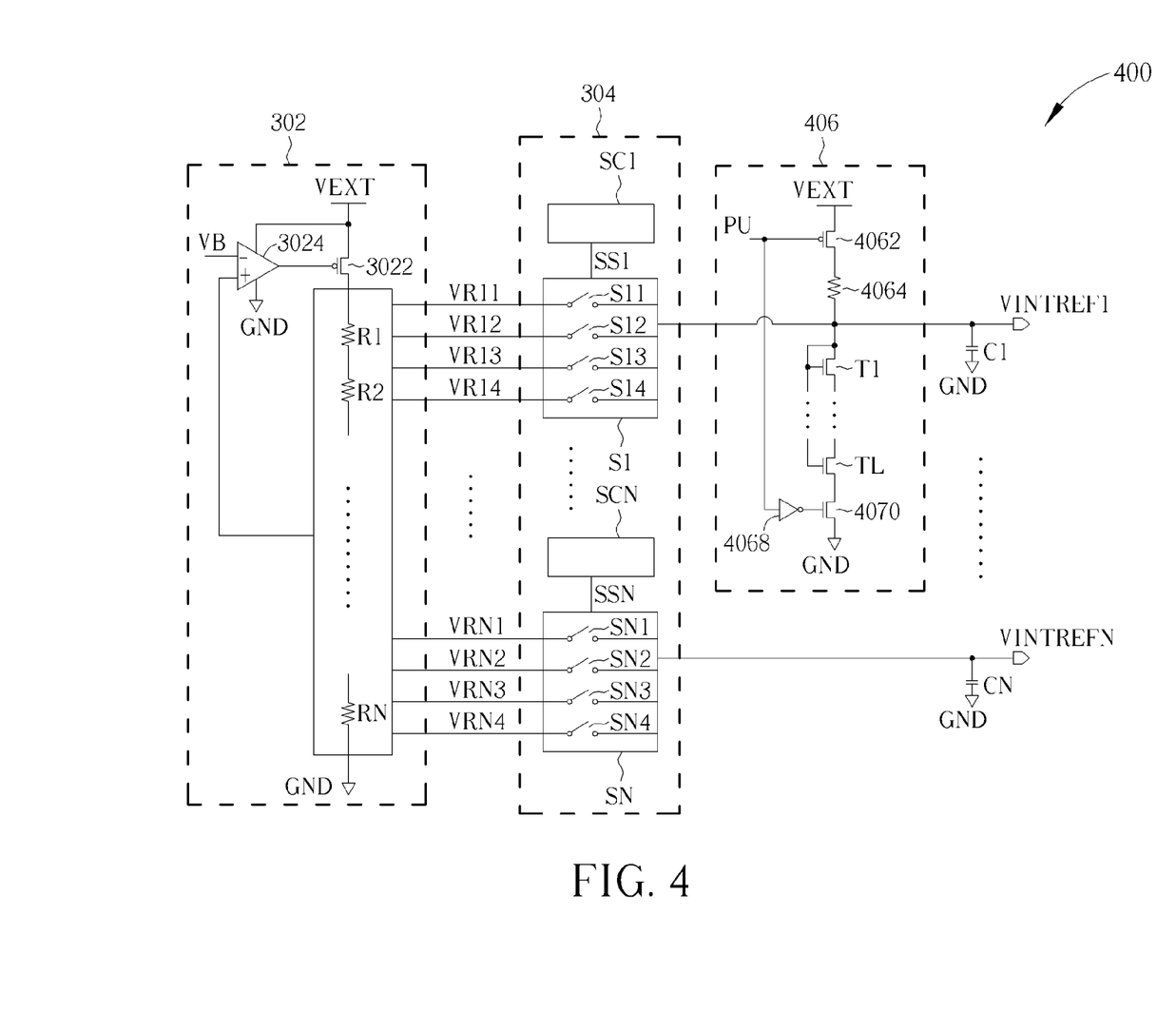
FIG. 4 is a diagram illustrating an initial voltage generation circuit according to another embodiment.

Please refer to FIG. 4. FIG. 4 is a diagram illustrating an initial voltage generation circuit 400 according to another embodiment. As shown in FIG. 4, a difference between the initial voltage generation circuit 400 and the initial voltage generation circuit 300 is that an initial voltage level regulator 406 of the initial voltage generation circuit 400 includes a second P-type metal-oxide-semiconductor transistor 4062, a first resistor 4064, L series diode-connected N-type metal-oxide-semiconductor transistors T1-TL, an inverter 4068, and a first N-type metal-oxide-semiconductor transistor 4070, where L is a positive integer. The second P-type metal-oxide-semiconductor transistor 4062 has a first terminal for receiving an external voltage VEXT, a second terminal for receiving a power-up signal PU, and a third terminal. The first resistor 4064 has a first terminal coupled to the third terminal of the second P-type metal-oxide-semiconductor transistor 4062, and a second terminal coupled to the first selection switch group S1 for outputting an inner reference voltage VINTREF1. The inverter 4068 has a first terminal coupled to the second terminal of the second P-type metal-oxide-semiconductor transistor 4062 for receiving the power-up signal PU, and a second terminal. The first N-type metal-oxide-semiconductor transistor 4070 has a first terminal, a second terminal coupled to the second terminal of the inverter 4068, and a third terminal coupled to ground GND. The L series diode-connected N-type metal-oxide-semiconductor transistors T1-TL are coupled between the first terminal of the first N-type metal-oxide-semiconductor transistor 4070 and the second terminal of the first resistor 4064. In addition, in another embodiment of the present invention, a diode-connected N-type metal-oxide-semiconductor transistor of the L series diode-connected N-type metal-oxide-semiconductor transistors T1-TL can be replaced with a diode, a diode-connected bipolar, or a diode-connected P-type metal-oxide-semiconductor transistor.

As shown in FIG. 4, when the power-up signal PU is low, because the second P-type metal-oxide-semiconductor transistor 4062 and the first N-type metal-oxide-semiconductor transistor 4070 are turned on, the inner reference voltage VINTREF1 is determined according to equation (2):

$$\text{VINTREF1} = \text{VTH} * C \tag{2}$$

As shown in equation (2), VTH is a threshold voltage of each diode-connected N-type metal-oxide-semiconductor transistor of the L series diode-connected N-type metal-oxide-semiconductor transistors N-type metal-oxide-semiconductor transistor T1-TL, and C is a constant. Therefore, when the power-up signal PU is low, the inner reference voltage VINTREF1 is equal to a sum of threshold voltages of the L series diode-connected N-type metal-oxide-semiconductor transistors T1-TL and a body effect. When the power-up signal PU is high, because the second P-type metal-oxide-semiconductor transistor 4062 and the first N-type metal-oxide-semiconductor transistor 4070 are turned off, the inner reference voltage VINTREF1 is equal to a reference voltage candidate (e.g. a reference voltage candidate VR11) outputted by the first selection switch group S1. A voltage VTH*C can be lower than a reference voltage candidate (e.g. the reference voltage candidate VR11) outputted by the first selection switch group S1. Therefore, the inner reference voltage VINTREF1 does not need a period of time to be increased to a target value. That is to say, when the power-up signal PU is low, the inner reference voltage VINTREF1 can first immediate be increased to the higher voltage VTH*C through the external voltage VEXT, the first resistor 4064, and the L series diode-connected N-type metal-oxide-semiconductor transistors T1-TL. Therefore, because the inner reference voltage VINTREF1 does not need a period of time to be increased to the target value during power-up of a system, some circuits within the system do not fail to power up. In addition, operational principles of the initial voltage generation circuit 400 are the same as those of the initial voltage generation circuit 300, so further description thereof is omitted for simplicity.

Figure 5:
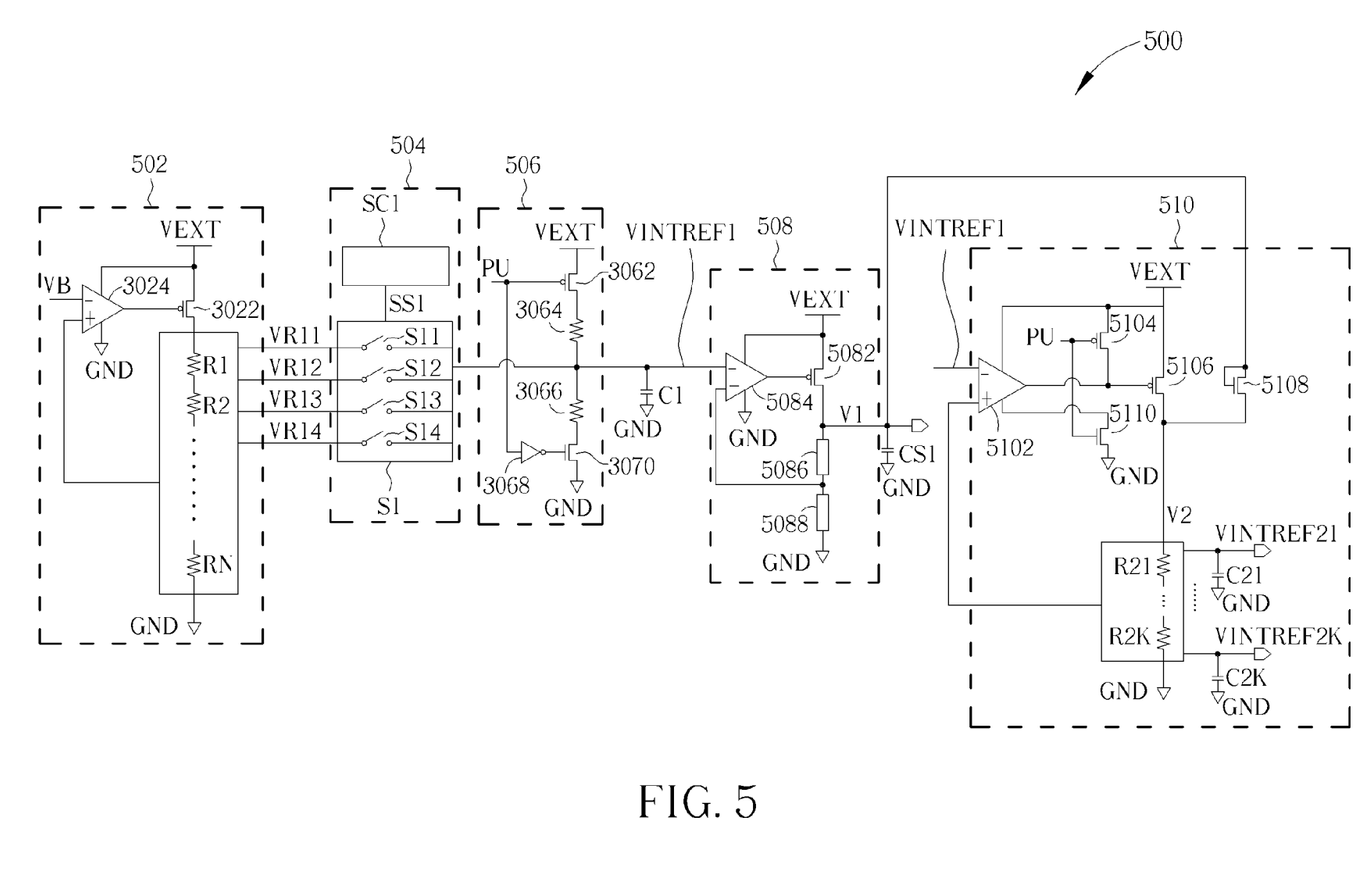
FIG. 5 is a diagram illustrating an initial voltage generation circuit according to another embodiment.

Please refer to FIG. 5. FIG. 5 is a diagram illustrating an initial voltage generation circuit 500 according to another embodiment. The initial voltage generation circuit 500 includes a first reference voltage generator 502, a reference voltage selector 504, an initial voltage level regulator 506, a stabilization capacitor C1, a low dropout regulation unit 508, and a second reference voltage generator 510. Operational principles of the first reference voltage generator 502, the reference voltage selector 504, and the initial voltage level regulator 506 are the same as those of the reference voltage generator 302, the reference voltage selector 304, and the initial voltage level regulator 306, so further description thereof is omitted for simplicity. In addition, as shown in FIG. 5, the reference voltage selector 504 includes a first selection switch group S1 and a switch control circuit SC1. But, the present invention is not limited to the reference voltage selector 504 only including the first selection switch group S1 and the switch control circuit SC1. That is to say, the reference voltage selector 504 can include at least one selection switch group and at least one switch control circuit. As shown in FIG. 5, the initial voltage level regulator 506 generates an inner reference voltage VINTREF1 according to a power-up signal PU, and the stabilization capacitor C1 is used for stabilizing the inner reference voltage VINTREF1. The low dropout regulation unit 508 is used for generating a first voltage V1 according to the inner reference voltage VINTREF1. The second reference voltage generator 510 is used for generating K second reference voltages VINTREF21-VINTREF2K according to the first voltage V1 and the inner reference voltage VINTREF1, where K is a positive integer. But, in another embodiment of the present invention, if the reference voltage selector 504 includes a plurality of selection switch groups and a plurality of switch control circuits, the second reference voltage generator 510 can generate the K second reference voltages VINTREF21-VINTREF2K according to the first voltage V1, and a reference voltage candidate (not generated by the first selection switch group S1). In addition, if the reference voltage selector 504 includes a plurality of selection switch groups and a plurality of switch control circuits, each selection switch group corresponds to a stabilization capacitor. In addition, in another embodiment of the present invention, the initial voltage level regulator 506 is the same as the initial voltage level regulator 406.

As shown in FIG. 5, the second reference voltage generator 510 includes a first amplifier 5102, a third P-type metal-oxide-semiconductor transistor 5104, a fourth P-type metal-oxide-semiconductor transistor 5106, a second N-type metal-oxide-semiconductor transistor 5108, a third N-type metal-oxide-semiconductor transistor 5110, K series resistors R21-R2K, and K second stabilization capacitors C21-C2K. In another embodiment of the present invention, the second N-type metal-oxide-semiconductor transistor 5108 can be replaced with a P-type metal-oxide-semiconductor transistor. The first amplifier 5102 has a first terminal for receiving an external voltage VEXT, a second terminal, a third terminal, a fourth terminal for receiving the inner reference voltage VINTREF1 (if the reference voltage selector 504 includes a plurality of selection switch groups and a plurality of switch control circuits, the fourth terminal of the first amplifier 5102 can receive a reference voltage candidate (not generated by the first selection switch group S1)), and a fifth terminal. The third P-type metal-oxide-semiconductor transistor 5104 has a first terminal for receiving the external voltage VEXT, a second terminal for receiving the power-up signal PU, and a third terminal coupled to the second terminal of the first amplifier 5102. The fourth P-type metal-oxide-semiconductor transistor 5106 has a first terminal for receiving the external voltage VEXT, a second terminal coupled to the second terminal of the first amplifier 5102, and a third terminal. The second N-type metal-oxide-semiconductor transistor 5108 has a first terminal coupled to the low dropout regulation unit 508, a second terminal coupled to the first terminal of the second N-type metal-oxide-semiconductor transistor 5108, and a third terminal coupled to the third terminal of the fourth P-type metal-oxide-semiconductor transistor 5106. The third N-type metal-oxide-semiconductor transistor 5110 has a first terminal coupled to the third terminal of the first amplifier 5102, a second terminal coupled to the second terminal of the third P-type metal-oxide-semiconductor transistor 5104, and a third terminal coupled to ground GND. The K series resistors R21-R2K are coupled to the third terminal of the fourth P-type metal-oxide-semiconductor transistor 5106, the fifth terminal of the first amplifier 5102, and the ground GND for generating the K second reference voltages VINTREF21-VINTREF2K according to the inner reference voltage VINTREF1 or the first voltage V1. Each second stabilization capacitors of the K second stabilization capacitors C21-C2K is used for stabilizing a second reference voltage of the K second reference voltages VINTREF21-VINTREF2K. In another embodiment of the present invention, the reference voltage selector 504 includes a plurality of selection switch groups and a plurality of switch control circuits and the K series resistors R21-R2K can output the K second reference voltages VINTREF21-VINTREF2K according to a reference voltage candidate (not generated by the first selection switch group S1).

As shown in FIG. 5, the low dropout regulation unit 508 includes a sixth P-type metal-oxide-semiconductor transistor 5082, a second amplifier 5084, a third resistor 5086, and a fourth resistor 5088. The sixth P-type metal-oxide-semiconductor transistor 5082 has a first terminal for receiving the external voltage VEXT, a second terminal, and a third terminal for outputting the first voltage V1. The second amplifier 5084 has a first terminal for receiving the external voltage VEXT, a second terminal coupled to the second terminal of the sixth P-type metal-oxide-semiconductor transistor 5082, a third terminal coupled to the ground GND, a fourth terminal coupled to the first selection switch group S1 for receiving the inner reference voltage VINTREF1, and a fifth terminal. The third resistor 5086 has a first terminal coupled to the third terminal of the sixth P-type metal-oxide-semiconductor transistor 5082, and a second terminal coupled to the fifth terminal of the second amplifier 5084. The fourth resistor 5088 has a first terminal coupled to the fifth terminal of the second amplifier 5084, and a second terminal coupled to the ground GND. In addition, as shown in FIG. 5, the initial voltage generation circuit 500 further includes a first stabilization capacitor CS1 coupled to the low dropout regulation unit 508 and the ground GND for stabilizing the first voltage V1.

As shown in FIG. 5, when the sixth P-type metal-oxide-semiconductor transistor 5082 operates in a saturation region, the first voltage V1 is determined according to equation (3):

$$V1 = VINTREF1 * ((r3+r4)/r4) \qquad (3)$$

As shown in equation (3), r3 is a resistance of the third resistor 5086 and r4 is a resistance of the fourth resistor 5088.

As shown in FIG. 5, when the power-up signal PU is low, the third P-type metal-oxide-semiconductor transistor 5104 is turned on, and the fourth P-type metal-oxide-semiconductor transistor 5106, the third N-type metal-oxide-semiconductor transistor 5110, and the first amplifier 5102 are turned off, each second reference voltage of the K second reference voltages VINTREF21-VINTREF2K is equal to a portion of a voltage V2 generated by the first voltage V1 minus a threshold voltage of the second N-type metal-oxide-semiconductor transistor 5108. That is to say, the K second reference voltages VINTREF21-VINTREF2K are generated through the voltage V2 being divided by the K series resistors R21-R2K.

When the power-up signal PU is high, the third P-type metal-oxide-semiconductor transistor 5104 is turned off, and the fourth P-type metal-oxide-semiconductor transistor 5106, the third N-type metal-oxide-semiconductor transistor 5110, and the first amplifier 5102 are turned on, each second reference voltage of the K second reference voltages VINTREF21-VINTREF2K equal to a portion of the inner reference voltage VINTREF1. That is to say, the K second reference voltages VINTREF21-VINTREF2K are generated through the inner reference voltage VINTREF1 being divided by the K series resistors R21-R2K, and the K second reference voltages VINTREF21-VINTREF2K are in proportion to the inner reference voltage VINTREF1, where ratios of the K second reference voltages VINTREF21-VINTREF2K to the inner reference voltage VINTREF1 are determined by the K series resistors R21-R2K. In addition, in another embodiment of the present invention, the reference voltage selector 504 includes a plurality of selection switch groups and a plurality of switch control circuits, and the K second reference voltages VINTREF21-VINTREF2K are generated through a reference voltage candidate (not generated by the first selection switch group S1) being divided by the K series resistors R21-R2K.

In addition, as shown in FIG. 5, after the inner reference voltage VINTREF1 is generated, the K second reference voltages VINTREF21-VINTREF2K are generated. That is to say, after power-up of the system is completed, the K second reference voltages VINTREF21-VINTREF2K are generated. In addition, the K second reference voltages VINTREF21-VINTREF2K can output to the system through another reference voltage selector.

Figure 6:
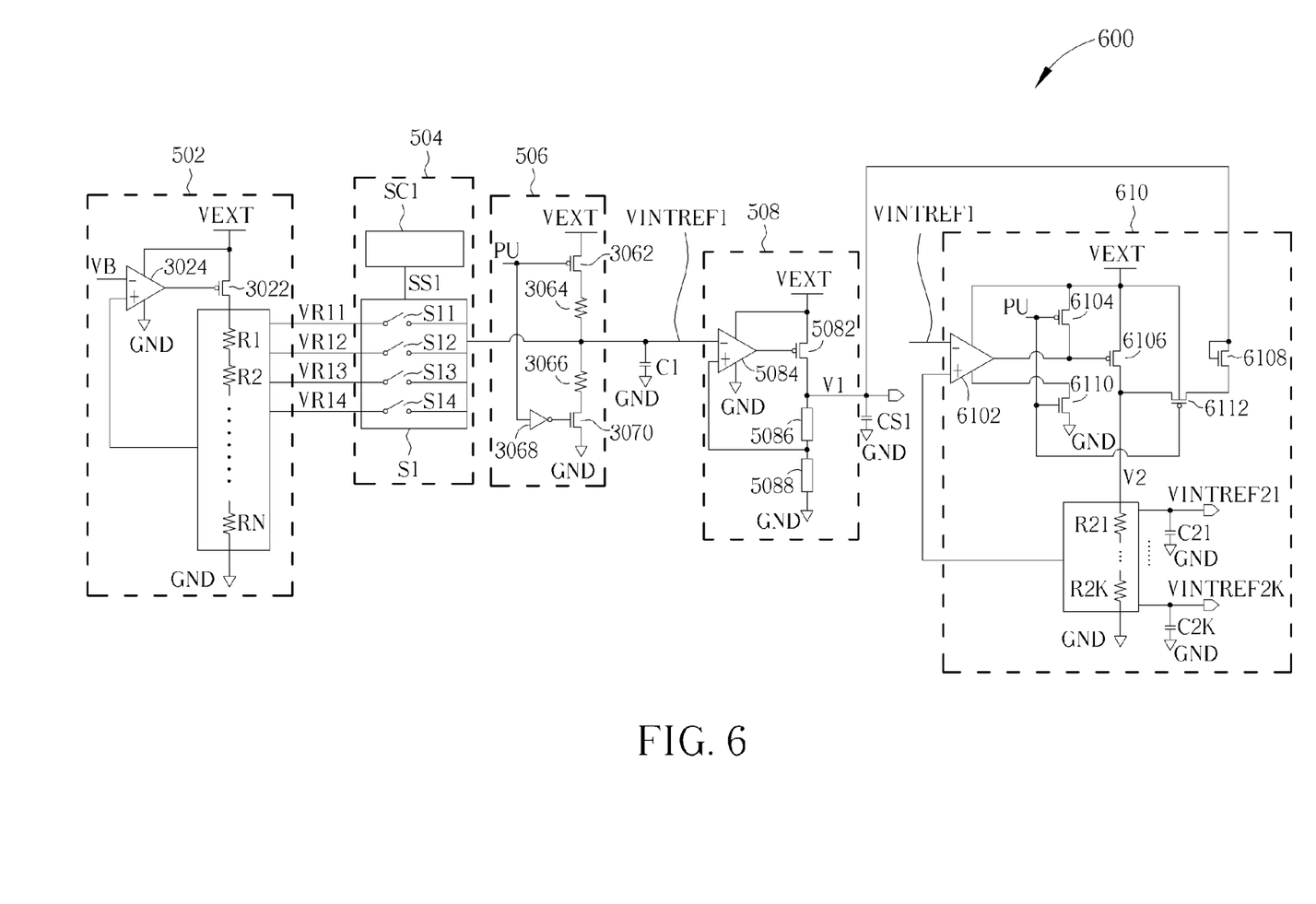
FIG. 6 is a diagram illustrating an initial voltage generation circuit according to another embodiment.

Please refer to FIG. 6. FIG. 6 is a diagram illustrating an initial voltage generation circuit 600 according to another embodiment. The initial voltage generation circuit 600 includes a first reference voltage generator 502, a reference voltage selector 504, an initial voltage level regulator 506, a stabilization capacitor C1, a low dropout regulation unit 508, and a second reference voltage generator 610. But, in another embodiment of the present invention, the initial voltage level regulator 506 is the same as the initial voltage level regulator 406. As shown in FIG. 6, the second reference voltage generator 610 includes a first amplifier 6102, a third P-type metal-oxide-semiconductor transistor 6104, a fourth P-type metal-oxide-semiconductor transistor 6106, a second N-type metal-oxide-semiconductor transistor 6108, a third N-type metal-oxide-semiconductor transistor 6110, a fifth P-type metal-oxide-semiconductor transistor 6112, K series resistors R21-R2K, and K second stabilization capacitors C21-C2K, where K is a positive integer. In another embodiment of the present invention, the second N-type metal-oxide-semiconductor transistor 6108 can be replaced with a P-type metal-oxide-semiconductor transistor, and a fifth P-type metal-oxide-semiconductor transistor 6112 can be replaced with an N-type metal-oxide-semiconductor transistor. The first amplifier 6102 has a first terminal for receiving an external voltage VEXT, a second terminal, a third terminal, a fourth terminal for receiving an inner reference voltage VINTREF1 (if the reference voltage selector 504 includes a plurality of selection switch groups and a plurality of switch control circuits, the fourth terminal of the first amplifier 6102 can receive a reference voltage candidate (not generated by the first selection switch group S1)), and a fifth terminal. The third P-type metal-oxide-semiconductor transistor 6104 has a first terminal for receiving the external voltage VEXT, a second terminal for receiving a power-up signal PU, and a third terminal coupled to the second terminal of the first amplifier 6102. The fourth P-type metal-oxide-semiconductor transistor 6106 has a first terminal for receiving the external voltage VEXT, a second terminal coupled to the second terminal of the first amplifier 6102, and a third terminal. The second N-type metal-oxide-semiconductor transistor 6108 has a first terminal coupled to the low dropout regulation unit 508, a second terminal coupled to the first terminal of the second N-type metal-oxide-semiconductor transistor 6108, and a third terminal. The third N-type metal-oxide-semiconductor transistor 6110 has a first terminal coupled to the third terminal of the first amplifier 6102, a second terminal coupled to the second terminal of the third P-type metal-oxide-semiconductor transistor 6104, and a third terminal coupled to ground GND. The fifth P-type metal-oxide-semiconductor transistor 6112 has a first terminal coupled to the third terminal of the second N-type metal-oxide-semiconductor transistor 6108, a second terminal coupled to the second terminal of the third P-type metal-oxide-semiconductor transistor 6110, and a third terminal coupled to the third terminal of the fourth P-type metal-oxide-semiconductor transistor 6106. The K series resistors R21-R2K are coupled to the third terminal of the fourth P-type metal-oxide-semiconductor transistor 6106, the fifth terminal of the first amplifier 6102, and the ground GND for generating K second reference voltages VINTREF21-VINTREF2K according to the inner reference voltage VINTREF1 or the first voltage V1. Each second stabilization capacitors of the K second stabilization capacitors C21-C2K is used for stabilizing a second reference voltage of the K second reference voltages VINTREF21-VINTREF2K.

As shown in FIG. 6, when the power-up signal PU is low, the third P-type metal-oxide-semiconductor transistor 6104 and the fifth P-type metal-oxide-semiconductor transistor 6112 are turned on, and the fourth P-type metal-oxide-semiconductor transistor 6106, the third N-type metal-oxide-semiconductor transistor 6110, and the first amplifier 6102 are turned off, each second reference voltage of the K second reference voltages VINTREF21-VINTREF2K is equal to a portion of a voltage V2 generated by the first voltage V1 minus a threshold voltage of the second N-type metal-oxide-semiconductor transistor 6108. That is to say, the K second reference voltages VINTREF21-VINTREF2K are generated through the voltage V2 being divided by the K series resistors R21-R2K.

When the power-up signal PU is high, the third P-type metal-oxide-semiconductor transistor 6104 and the fifth P-type metal-oxide-semiconductor transistor 6112 are turned off, and the fourth P-type metal-oxide-semiconductor transistor 6106, the third N-type metal-oxide-semiconductor transistor 6110, and the first amplifier 6102 are turned on, each second reference voltage of the K second reference voltages VINTREF21-VINTREF2K is equal to a portion of the inner reference voltage VINTREF1. That is to say, the K second reference voltages VINTREF21-VINTREF2K are generated through the inner reference voltage VINTREF1 being divided by the K series resistors R21-R2K, and the K second reference voltages VINTREF21-VINTREF2K are in proportion to the inner reference voltage VINTREF1, where ratios of the K second reference voltages VINTREF21-VINTREF2K to the inner reference voltage VINTREF1 are determined by the K series resistors R21-R2K. In addition, in another embodiment of the present invention, the reference voltage selector 504 includes a plurality of selection switch groups and a plurality of switch control circuits, and the K second reference voltages VINTREF21-VINTREF2K are generated through a reference voltage candidate (not generated by the first selection switch group S1) being divided by the K series resistors R21-R2K. In addition, subsequent operational principles of the initial voltage generation circuit 600 are the same as those of the initial voltage generation circuit 500, so further description thereof is omitted for simplicity.

Figure 7:
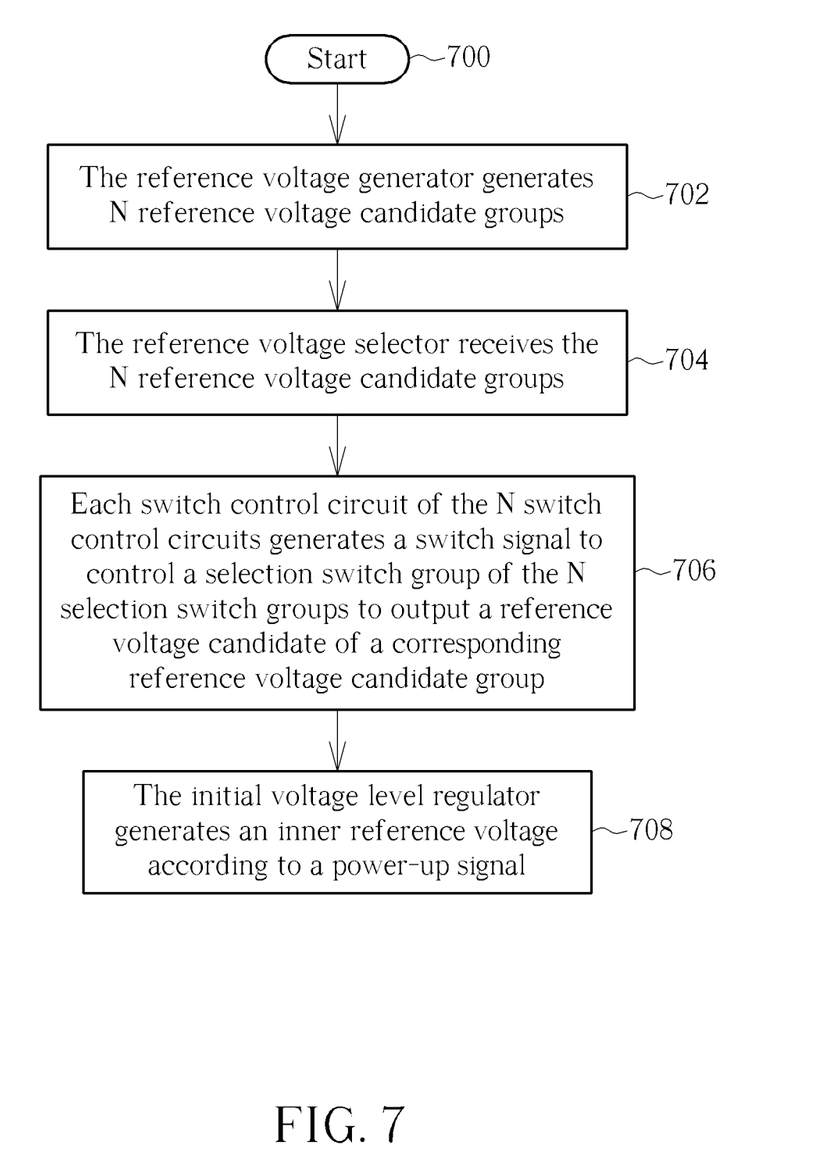
FIG. 7 is a flowchart illustrating a method of generating an initial voltage according to another embodiment.

Please refer to FIG. 3, FIG. 4, and FIG. 7. FIG. 7 is a flowchart illustrating a method of generating an initial voltage according to another embodiment. The method in FIG. 7 is illustrated using the initial voltage generation circuit 300 in FIG. 3 and the initial voltage generation circuit 400 in FIG. 4. Detailed steps are as follows:

Step 700: Start.

Step 702: The reference voltage generator 302 generates N reference voltage candidate groups.

Step 704: The reference voltage selector 304 receives the N reference voltage candidate groups.

Step 706: Each switch control circuit of the N switch control circuits SC1-SCN generates a switch signal to control a selection switch group of the N selection switch groups S1-SN to output a reference voltage candidate of a corresponding reference voltage candidate group.

Step 708: The initial voltage level regulator generates an inner reference voltage VINTREF1 according to a power-up signal PU.

As shown in FIG. 3, in Step 702, the reference voltage generator 302 outputs the N reference voltage candidate groups according to a bandgap reference voltage VB and resistances of the resistors R1-RN. In Step 706, each switch control circuit of the N switch control circuits SC1-SCN corresponds to a selection switch group of the N selection switch groups S1-SN for generating a switch signal to control the selection switch group to output a reference voltage candidate of a corresponding reference voltage candidate group. For example, the switch control circuit SC1 corresponds to the first selection switch group S1 for generating a switch signal SS1 to control the first selection switch group S1 to output a reference voltage candidate (e.g. a reference voltage candidate VR11) of a first reference voltage candidate group VR11-VR14. That is to say, the first selection switch group S1 turns off the switches S12-S14 and turns on the switch S11 according to the switch signal SS1, so the first selection switch group S1 can output the reference voltage candidate VR11. In Step 708, as shown in FIG. 3, when the power-up signal PU is low, because the second P-type metal-oxide-semiconductor transistor 3062 and the First N-type metal-oxide-semiconductor transistor 3070 are turned on, the inner reference voltage VINTREF1 is generated according to equation (1). That is to say, the inner reference voltage VINTREF1 is determined by the external voltage VEXT, the first resistor 3064, and the second resistor 3066. In Step 708, as shown in FIG. 4, when the power-up signal PU is low, because the second P-type metal-oxide-semiconductor transistor 4062 and the first N-type metal-oxide-semiconductor transistor 4070 are turned on, the inner reference voltage VINTREF1 is equal to a sum of threshold voltages of the L series diode-connected N-type metal-oxide-semiconductor transistors T1-TL included in the initial voltage level regulator 406 and a body effect. In Step 708, as shown in FIG. 3, when the power-up signal PU is high, because the second P-type metal-oxide-semiconductor transistor 3062 and the First N-type metal-oxide-semiconductor transistor 3070 are turned off, the inner reference voltage VINTREF1 is equal to the reference voltage candidate (e.g. the reference voltage candidate VR11) outputted by the first selection switch group S1. In Step 708, as shown in FIG. 4, when the power-up signal PU is high, because the second P-type metal-oxide-semiconductor transistor 4062 and the first N-type metal-oxide-semiconductor transistor 4070 are turned off, the inner reference voltage VINTREF1 is equal to the reference voltage candidate (e.g. the reference voltage candidate VR11) outputted by the first selection switch group S1. In addition, the power-up signal PU is generated by a power-up unit of a system, where the initial voltage generation circuit 300 is applied to the system.

Figure 8:
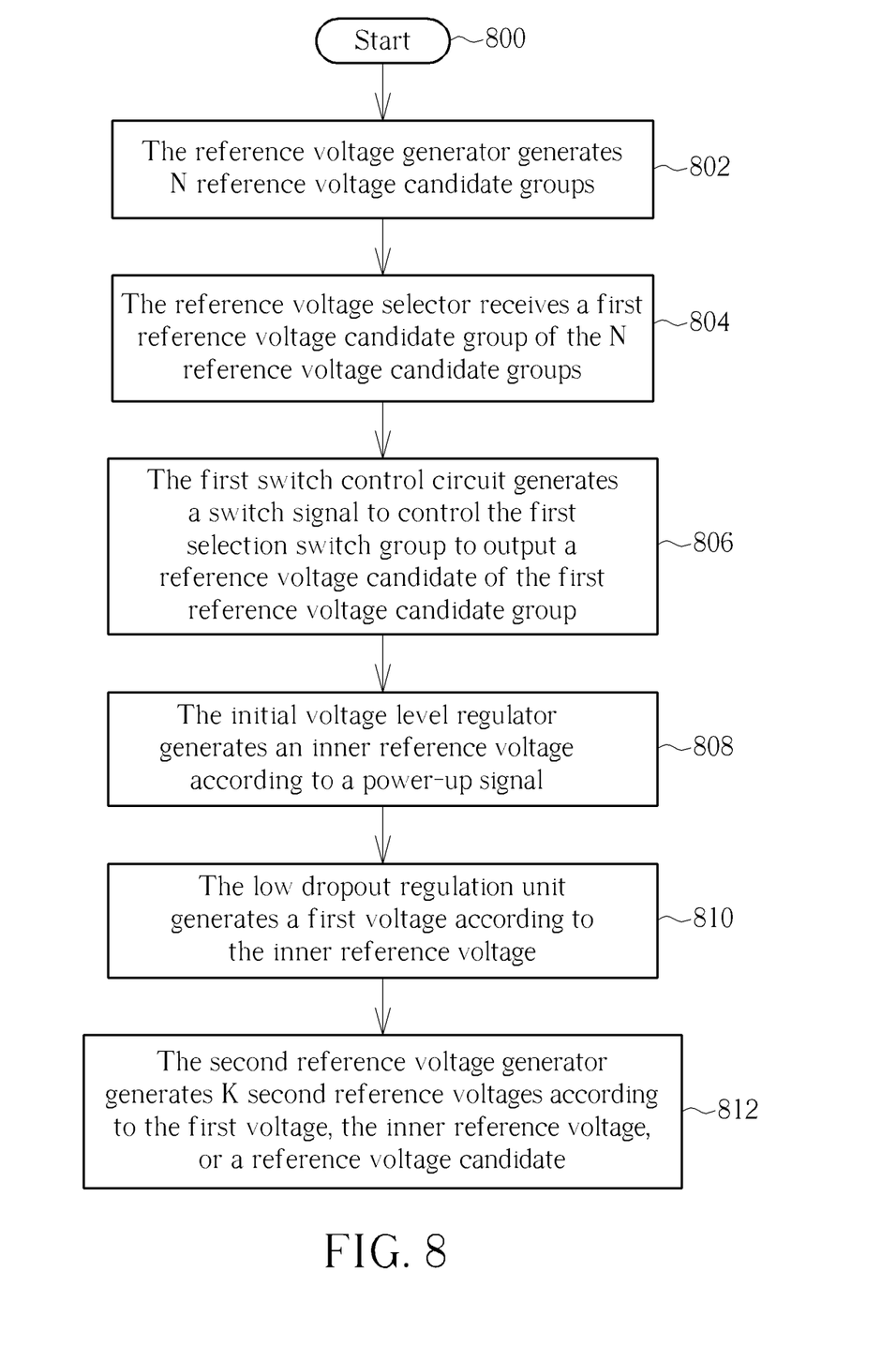
FIG. 8 is a flowchart illustrating a method of generating an initial voltage according to another embodiment.

Please refer to FIG. 5, FIG. 6, and FIG. 8. FIG. 8 is a flowchart illustrating a method of generating an initial voltage according to another embodiment. The method in FIG. 8 is illustrated using the initial voltage generation circuit 500 in FIG. 5 and the initial voltage generation circuit 600 in FIG. 6. Detailed steps are as follows:

Step 800: Start.

Step 802: The reference voltage generator 502 generates N reference voltage candidate groups.

Step 804: The reference voltage selector 504 receives a first reference voltage candidate group of the N reference voltage candidate groups.

Step 806: The first switch control circuit SC1 generates a switch signal SS1 to control the first selection switch group S1 to output a reference voltage candidate of the first reference voltage candidate group.

Step 808: The initial voltage level regulator 506 generates an inner reference voltage VINTREF1 according to a power-up signal PU.

Step 810: The low dropout regulation unit 508 generates a first voltage V1 according to the inner reference voltage VINTREF1.

Step 812: The second reference voltage generator generates K second reference voltages VINTREF21-VINTREF2K according to the first voltage V1, the inner reference voltage VINTREF1, or a reference voltage candidate.

In Step 808, when the initial voltage level regulator 506 is the same as the initial voltage level regulator 306, the inner reference voltage VINTREF1 can be generated according to equation (1); when the initial voltage level regulator 506 is the same as the initial voltage level regulator 406, the inner reference voltage VINTREF1 can be generated according to equation (2). In Step 810, the first voltage V1 can be generated according to equation (3). In Step 812, as shown in FIG. 5, when the power-up signal PU is low, the third P-type metal-oxide-semiconductor transistor 5104 of the second reference voltage generator 510 is turned on, and the fourth P-type metal-oxide-semiconductor transistor 5106, the third N-type metal-oxide-semiconductor transistor 5110, and the first amplifier 5102 are turned off, so each second reference voltage of the K second reference voltages VINTREF21-VINTREF2K is equal to a portion of a voltage V2 generated by the first voltage V1 minus a threshold voltage of the second N-type metal-oxide-semiconductor transistor 5108. In Step 812, as shown in FIG. 5, when the power-up signal PU is high, the third P-type metal-oxide-semiconductor transistor 5104 of the second reference voltage generator 510 is turned off, and the fourth P-type metal-oxide-semiconductor transistor 5106, the third N-type metal-oxide-semiconductor transistor 5110, and the first amplifier 5102 are turned on, so each second reference voltage of the K second reference voltages VINTREF21-VINTREF2K is equal to a portion of the inner reference voltage VINTREF1. In addition, operational principles of the second reference voltage generator 610 are the same as those of the second reference voltage generator 510, so further description thereof is omitted for simplicity.

To sum up, the initial voltage generation circuit and the method of generating an initial voltage utilize the initial voltage level regulator to generate an appropriate voltage level of an inner reference voltage according to a power-up signal to accelerate a power-up process of a system. Compared to the prior art, because the inner reference voltage does not need a longer period of time to be increased to a target value, some circuits within the system do not fail to power up. Therefore, the initial voltage generation circuit and the method of generating an initial voltage presented by the present invention can be normally applied to any process, voltage and temperature (PVT) variation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An initial voltage generation circuit, comprising:
   a reference voltage generator for generating a plurality of reference voltage candidate groups;
   a reference voltage selector for receiving the plurality of reference voltage candidate groups, the reference voltage selector comprising:
      a plurality of selection switch groups, wherein each selection switch group corresponds to a reference voltage candidate group of the plurality of reference voltage candidate groups, and the each selection switch group comprises a plurality of parallel switches; and
      a plurality of switch control circuits, wherein each switch control circuit corresponds to a selection switch group of the plurality of selection switch groups for generating a switch signal to control the selection switch group to output a reference voltage candidate of a corresponding reference voltage candidate group;
   at least one initial voltage level regulator; and
   a plurality of stabilization capacitors;
   wherein each initial voltage level regulator of the at least one initial voltage level regulator and a corresponding stabilization capacitor of the plurality of stabilization capacitors are coupled to a corresponding selection switch group of the plurality of selection switch groups, wherein the each initial voltage level regulator is used for generating an inner reference voltage according to an external power-up signal, and the corresponding stabilization capacitor is used for stabilizing the inner reference voltage;
   wherein the external power-up signal is generated by a power-up unit of a system, the initial voltage generation circuit is applied to the system, and the each initial voltage level regulator utilizes the external power-up signal to simultaneously control switches thereof to generate the inner reference voltage.

2. The initial voltage generation circuit of claim 1, wherein the reference voltage generator comprises:
   a first P-type metal-oxide-semiconductor transistor having a first terminal for receiving an external voltage, a second terminal, and a third terminal;
   an amplifier having a first terminal for receiving the external voltage, a second terminal coupled to the second terminal of the first P-type metal-oxide-semiconductor transistor, a third terminal coupled to ground, a fourth terminal for receiving a bandgap reference voltage, and a fifth terminal; and
   a plurality of series resistors, wherein the plurality of series resistors are coupled to the third terminal of the first P-type metal-oxide-semiconductor transistor, the fifth terminal of the amplifier, and the ground for outputting the plurality of reference voltage candidate groups according to the bandgap reference voltage.

3. The initial voltage generation circuit of claim 1, wherein the each initial voltage level regulator comprises:
   a second P-type metal-oxide-semiconductor transistor having a first terminal for receiving an external voltage, a second terminal for receiving the external power-up signal, and a third terminal;
   a first resistor having a first terminal coupled to the third terminal of the second P-type metal-oxide-semiconductor transistor, and a second terminal coupled to the corresponding selection switch group for outputting the inner reference voltage;
   a second resistor having a first terminal coupled to the second terminal of the first resistor, and a second terminal;
   an inverter having a first terminal coupled to the second terminal of the second P-type metal-oxide-semiconductor transistor for receiving the external power-up signal, and a second terminal; and
   a first N-type metal-oxide-semiconductor transistor having a first terminal coupled to the second terminal of the second resistor, a second terminal coupled to the second terminal of the inverter, and a third terminal coupled to ground.

4. The initial voltage generation circuit of claim 3, wherein when the external power-up signal is low, the inner reference voltage is in proportion to the external voltage, wherein a ratio of the inner reference voltage to the external voltage is determined by the first resistor and the second resistor.

5. The initial voltage generation circuit of claim 3, wherein when the external power-up signal is high, the inner reference voltage is equal to the reference voltage candidate outputted by the corresponding selection switch group.

6. The initial voltage generation circuit of claim 1, wherein the each initial voltage level regulator comprises:
   a second P-type metal-oxide-semiconductor transistor having a first terminal for receiving an external voltage, a second terminal for receiving the external power-up signal, and a third terminal;
   a first resistor having a first terminal coupled to the third terminal of the second P-type metal-oxide-semiconductor transistor, and a second terminal coupled to the corresponding selection switch group for outputting the inner reference voltage;
   an inverter having a first terminal coupled to the second terminal of the second P-type metal-oxide-semiconductor transistor for receiving the external power-up signal, and a second terminal;
   a first N-type metal-oxide-semiconductor transistor having a first terminal, a second terminal coupled to the second terminal of the inverter, and a third terminal coupled to ground; and
   a plurality of series diode-connected N-type metal-oxide-semiconductor transistors coupled between the first terminal of the first N-type metal-oxide-semiconductor transistor and the second terminal of the first resistor.

7. The initial voltage generation circuit of claim 6, wherein when the external power-up signal is low, the inner reference voltage is equal to a sum of threshold voltages of the plurality of series diode-connected N-type metal-oxide-semiconductor transistors and a body effect.

8. The initial voltage generation circuit of claim 6, wherein when the external power-up signal is high, the inner reference voltage is equal to the reference voltage candidate outputted by the corresponding selection switch group.

9. An initial voltage generation circuit, comprising:
a first reference voltage generator for generating a plurality of reference voltage candidate groups;
a reference voltage selector comprising at least one selection switch group and at least one switch control circuit for receiving at least one reference voltage candidate group of the plurality of reference voltage candidate groups, wherein each selection switch group corresponds to a reference voltage candidate group of the at least one reference voltage candidate group and a switch control circuit of the at least one switch control circuit, wherein the switch control circuit is used for generating a switch signal to control the selection switch group to output a reference voltage candidate of the reference voltage candidate group;
an initial voltage level regulator;
at least one stabilization capacitor, wherein the initial voltage level regulator and a stabilization capacitor of the at least one stabilization capacitor are coupled to a selection switch group of the at least one selection switch group, wherein the initial voltage level regulator is used for generating an inner reference voltage according to a power-up signal, and the stabilization capacitor is used for stabilizing the inner reference voltage;
a low dropout regulation unit for generating a first voltage according to the inner reference voltage; and
a second reference voltage generator for generating a plurality of second reference voltages according to the power-up signal and the first voltage, the power-up signal and the inner reference voltage, or the power-up signal and a reference voltage candidate.

10. The initial voltage generation circuit of claim 9, wherein the reference voltage generator comprises:
a first P-type metal-oxide-semiconductor transistor having a first terminal for receiving an external voltage, a second terminal, and a third terminal;
an amplifier having a first terminal for receiving the external voltage, a second terminal coupled to the second terminal of the first P-type metal-oxide-semiconductor transistor, a third terminal coupled to ground, a fourth terminal for receiving a bandgap reference voltage, and a fifth terminal; and
a plurality of series resistors, wherein the plurality of series resistors are coupled to the third terminal of the first P-type metal-oxide-semiconductor transistor, the fifth terminal of the amplifier, and the ground for outputting the plurality of reference voltage candidate groups according to the bandgap reference voltage.

11. The initial voltage generation circuit of claim 9, wherein the initial voltage level regulator comprises:
a second P-type metal-oxide-semiconductor transistor having a first terminal for receiving an external voltage, a second terminal for receiving the power-up signal, and a third terminal;
a first resistor having a first terminal coupled to the third terminal of the second P-type metal-oxide-semiconductor transistor, and a second terminal coupled to the selection switch group for outputting the inner reference voltage;
a second resistor having a first terminal coupled to the second terminal of the first resistor, and a second terminal;
an inverter having a first terminal coupled to the second terminal of the second P-type metal-oxide-semiconductor transistor for receiving the power-up signal, and a second terminal; and
a first N-type metal-oxide-semiconductor transistor having a first terminal coupled to the second terminal of the second resistor, a second terminal coupled to the second terminal of the inverter, and a third terminal coupled to ground.

12. The initial voltage generation circuit of claim 11, wherein when the power-up signal is low, the inner reference voltage is in proportion to the external voltage, wherein a ratio of the inner reference voltage to the external voltage is determined by the first resistor and the second resistor.

13. The initial voltage generation circuit of claim 11, wherein when the power-up signal is high, the inner reference voltage is equal to the reference voltage candidate outputted by the selection switch group.

14. The initial voltage generation circuit of claim 9, wherein the initial voltage level regulator comprises:
a second P-type metal-oxide-semiconductor transistor having a first terminal for receiving an external voltage, a second terminal for receiving a power-up signal, and a third terminal;
a first resistor having a first terminal coupled to the third terminal of the second P-type metal-oxide-semiconductor transistor, and a second terminal coupled to the selection switch group for outputting the inner reference voltage;
an inverter having a first terminal coupled to the second terminal of the second P-type metal-oxide-semiconductor transistor for receiving the power-up signal, and a second terminal;
a first N-type metal-oxide-semiconductor transistor having a first terminal, a second terminal coupled to the second terminal of the inverter, and a third terminal coupled to ground; and
a plurality of series diode-connected N-type metal-oxide-semiconductor transistors coupled between the first terminal of the first N-type metal-oxide-semiconductor transistor and the second terminal of the first resistor.

15. The initial voltage generation circuit of claim 14, wherein when the power-up signal is low, the inner reference voltage is equal to a sum of threshold voltages of the plurality of series diode-connected N-type metal-oxide-semiconductor transistors and a body effect.

16. The initial voltage generation circuit of claim 14, wherein when the power-up signal is high, the inner reference voltage is equal to the reference voltage candidate outputted by the selection switch group.

17. The initial voltage generation circuit of claim 9, wherein the second reference voltage generator comprises:
a first amplifier having a first terminal for receiving an external voltage, a second terminal, a third terminal, a fourth terminal for receiving the inner reference voltage or the reference voltage candidate, and a fifth terminal;
a third P-type metal-oxide-semiconductor transistor having a first terminal for receiving the external voltage, a second terminal for receiving a power-up signal, and a third terminal coupled to the second terminal of the first amplifier;

a fourth P-type metal-oxide-semiconductor transistor having a first terminal for receiving the external voltage, a second terminal coupled to the second terminal of the first amplifier, and a third terminal;

a second N-type metal-oxide-semiconductor transistor having a first terminal coupled to the low dropout regulation unit, a second terminal coupled to the first terminal of the second N-type metal-oxide-semiconductor transistor, and a third terminal coupled to the third terminal of the fourth P-type metal-oxide-semiconductor transistor;

a third N-type metal-oxide-semiconductor transistor having a first terminal coupled to the third terminal of the first amplifier, a second terminal coupled to the second terminal of the third P-type metal-oxide-semiconductor transistor, and a third terminal coupled to ground;

a plurality of series resistors, wherein the plurality of series resistors are coupled to the third terminal of the fourth P-type metal-oxide-semiconductor transistor, the fifth terminal of the first amplifier, and the ground for generating the plurality of second reference voltages according to the power-up signal and the first voltage, the power-up signal and the inner reference voltage, or the power-up signal and the reference voltage candidate; and a plurality of second stabilization capacitors, wherein each second stabilization capacitors is used for stabilizing a second reference voltage of the plurality of second reference voltages.

18. The initial voltage generation circuit of claim 17, wherein when the power-up signal is low, each second reference voltage of the plurality of second reference voltages is equal to a portion of a voltage generated by the first voltage minus a threshold voltage of the second N-type metal-oxide-semiconductor transistor.

19. The initial voltage generation circuit of claim 17, wherein when the power-up signal is high, each second reference voltage of the plurality of second reference voltages is equal to a portion of the inner reference voltage, or each second reference voltage of the plurality of second reference voltages is equal to a portion of the reference voltage candidate.

20. The initial voltage generation circuit of claim 9, wherein the second reference voltage generator comprises:
    a first amplifier having a first terminal for receiving an external voltage, a second terminal, a third terminal, a fourth terminal for receiving the inner reference voltage or the reference voltage candidate, and a fifth terminal;
    a third P-type metal-oxide-semiconductor transistor having a first terminal for receiving the external voltage, a second terminal for receiving a power-up signal, and a third terminal coupled to the second terminal of the first amplifier;
    a fourth P-type metal-oxide-semiconductor transistor having a first terminal for receiving the external voltage, a second terminal coupled to the second terminal of the first amplifier, and a third terminal;
    a second N-type metal-oxide-semiconductor transistor having a first terminal coupled to the low dropout regulation unit, a second terminal coupled to the first terminal of the second N-type metal-oxide-semiconductor transistor, and a third terminal;
    a third N-type metal-oxide-semiconductor transistor having a first terminal coupled to the third terminal of the first amplifier, a second terminal coupled to the second terminal of the third P-type metal-oxide-semiconductor transistor, and a third terminal coupled to ground;
    a fifth P-type metal-oxide-semiconductor transistor having a first terminal coupled to the third terminal of the second N-type metal-oxide-semiconductor transistor, a second terminal coupled to the second terminal of the third P-type metal-oxide-semiconductor transistor, and a third terminal coupled to the third terminal of the fourth P-type metal-oxide-semiconductor transistor;
    a plurality of series resistors, wherein the plurality of series resistors are coupled to the third terminal of the fourth P-type metal-oxide-semiconductor transistor, the fifth terminal of the first amplifier, and the ground for generating the plurality of second reference voltages according to the power-up signal and the first voltage, the power-up signal and the inner reference voltage, or the power-up signal and the reference voltage candidate; and
    a plurality of second stabilization capacitors, wherein each second stabilization capacitors is used for stabilizing a second reference voltage of the plurality of second reference voltages.

21. The initial voltage generation circuit of claim 20, wherein when the power-up signal is low, each second reference voltage of the plurality of second reference voltages is equal to a portion of a voltage generated by the first voltage minus a threshold voltage of the second N-type metal-oxide-semiconductor transistor.

22. The initial voltage generation circuit of claim 20, wherein when the power-up signal is high, each second reference voltage of the plurality of second reference voltages is equal to a portion of the inner reference voltage, or each second reference voltage of the plurality of second reference voltages is equal to a portion of the reference voltage candidate.

23. The initial voltage generation circuit of claim 9, wherein the low dropout regulation unit comprises:
    a sixth P-type metal-oxide-semiconductor transistor having a first terminal for receiving an external voltage, a second terminal, and a third terminal for outputting the first voltage;
    a second amplifier having a first terminal for receiving the external voltage, a second terminal coupled to the second terminal of the sixth P-type metal-oxide-semiconductor transistor, a third terminal coupled to ground, a fourth terminal coupled to the selection switch group for receiving the inner reference voltage, and a fifth terminal;
    a third resistor having a first terminal coupled to the third terminal of the sixth P-type metal-oxide-semiconductor transistor, and a second terminal coupled to the fifth terminal of the second amplifier; and
    a fourth resistor having a first terminal coupled to the fifth terminal of the second amplifier, and a second terminal coupled to the ground.

24. The initial voltage generation circuit of claim 9, further comprising:
    a first stabilization capacitor coupled to the low dropout regulation unit and ground for stabilizing the first voltage.

25. A method of generating an initial voltage, wherein an initial voltage generation circuit comprises a reference voltage generator, a reference voltage selector, at least one initial voltage level regulator, and a plurality of stabilization capacitors, and the reference voltage selector comprises a plurality of selection switch groups and a plurality of switch control circuits, the method comprising:
    the reference voltage generator generating a plurality of reference voltage candidate groups;

the reference voltage selector receiving the plurality of reference voltage candidate groups;

each switch control circuit of the plurality of switch control circuits generating a switch signal to control a selection switch group to output a reference voltage candidate of a corresponding reference voltage candidate group; and each initial voltage level regulator of the at least one initial voltage level regulator generating an inner reference voltage according to an external power-up signal;

wherein the external power-up signal is generated by a power-up unit of a system, the initial voltage generation circuit is applied to the system, and the each initial voltage level regulator utilizes the external power-up signal to simultaneously control switches thereof to generate the inner reference voltage.

26. The method of claim 25, wherein when the external power-up signal is low, the inner reference voltage is in proportion to the external voltage, wherein a ratio of the inner reference voltage to the external voltage is determined by a first resistor and a second resistor.

27. The method of claim 25, wherein when the external power-up signal is high, the inner reference voltage is equal to a corresponding reference voltage candidate outputted by a corresponding selection switch group coupled to the each initial voltage level regulator.

28. The method of claim 25, wherein when the external power-up signal is low, the inner reference voltage is equal to a sum of threshold voltages of a plurality of series diode-connected N-type metal-oxide-semiconductor transistors comprised in the each initial voltage level regulator and a body effect.

29. A method of generating an initial voltage, wherein an initial voltage generation circuit comprises a first reference voltage generator, a reference voltage selector, an initial voltage level regulator, at least one stabilization capacitor, a low dropout regulation unit, and a second reference voltage generator, and the reference voltage selector comprises at least one selection switch group and at least one switch control circuit, the method comprising:

the first reference voltage generator generating a plurality of reference voltage candidate groups;

each selection switch group of the at least one selection switch group generating a switch signal to control a selection switch group to output a reference voltage candidate of a corresponding reference voltage candidate group;

the initial voltage level regulator generating an inner reference voltage according to a power-up signal;

the low dropout regulation unit generating a first voltage according to the inner reference voltage; and the second reference voltage generator generating a plurality of second reference voltages according to the power-up signal and the first voltage, the power-up signal and the inner reference voltage, or the power-up signal and a reference voltage candidate.

30. The method of claim 29, wherein when the power-up signal is low, each second reference voltage of the plurality of second reference voltages is equal to a portion of a voltage generated by the first voltage minus a threshold voltage of a second N-type metal-oxide-semiconductor transistor comprised in the second reference voltage generator.

31. The method of claim 29, wherein when the power-up signal is high, the plurality of second reference voltages are in proportion to the inner reference voltage, or the plurality of second reference voltages are in proportion to the reference voltage candidate, wherein ratios of the plurality of second reference voltages to the inner reference voltage and ratios of the plurality of second reference voltages to the reference voltage candidate are determined by a plurality of series resistors comprised in the second reference voltage generator.

32. An initial voltage generation circuit, comprising:
a reference voltage generator for generating a plurality of reference voltage candidate groups;
a reference voltage selector for receiving the plurality of reference voltage candidate groups, the reference voltage selector comprising:
a plurality of selection switch groups, wherein each selection switch group corresponds to a reference voltage candidate group of the plurality of reference voltage candidate groups, and the each selection switch group comprises a plurality of parallel switches; and
a plurality of switch control circuits, wherein each switch control circuit corresponds to a selection switch group of the plurality of selection switch groups for generating a switch signal to control the selection switch group to output a reference voltage candidate of a corresponding reference voltage candidate group;
at least one initial voltage level regulator; and
a plurality of stabilization capacitors;
wherein each initial voltage level regulator of the at least one initial voltage level regulator and a corresponding stabilization capacitor of the plurality of stabilization capacitors are coupled to a corresponding selection switch group of the plurality of selection switch groups, wherein the each initial voltage level regulator is used for generating an inner reference voltage according to an external power-up signal, and the corresponding stabilization capacitor is used for stabilizing the inner reference voltage;
wherein when the external power-up signal is low, the inner reference voltage is in proportion to an external voltage applied to the each initial voltage level regulator, wherein a ratio of the inner reference voltage to the external voltage is determined by a resistor ratio within the each initial voltage level regulator;
wherein when the external power-up signal is high, the inner reference voltage is equal to the reference voltage candidate outputted by the corresponding selection switch group.

33. An initial voltage generation circuit, comprising:
a reference voltage generator for generating a plurality of reference voltage candidate groups;
a reference voltage selector for receiving the plurality of reference voltage candidate groups, the reference voltage selector comprising:
a plurality of selection switch groups, wherein each selection switch group corresponds to a reference voltage candidate group of the plurality of reference voltage candidate groups, and the each selection switch group comprises a plurality of parallel switches; and
a plurality of switch control circuits, wherein each switch control circuit corresponds to a selection switch group of the plurality of selection switch groups for generating a switch signal to control the selection switch group to output a reference voltage candidate of a corresponding reference voltage candidate group;
at least one initial voltage level regulator; and
a plurality of stabilization capacitors;
wherein each initial voltage level regulator of the at least one initial voltage level regulator and a corresponding stabilization capacitor of the plurality of stabilization capacitors are coupled to a corresponding selection switch group of the plurality of selection switch groups, wherein the each initial voltage level regulator is used for generating an inner reference voltage according to an external power-up signal, and the corresponding stabilization capacitor is used for stabilizing the inner reference voltage;

wherein when the external power-up signal is low, the inner reference voltage is equal to a sum of threshold voltages of a plurality of series diode-connected N-type metal-oxide-semiconductor transistors comprised in the each initial voltage level regulator and a body effect;

wherein when the external power-up signal is high, the inner reference voltage is equal to the reference voltage candidate outputted by the corresponding selection switch group.

* * * * *